(12) United States Patent
Karabacak et al.

(10) Patent No.: US 10,903,578 B2
(45) Date of Patent: Jan. 26, 2021

(54) HYBRID MIMO ARCHITECTURE USING LENS ARRAYS

(71) Applicant: University of South Florida, Tampa, FL (US)

(72) Inventors: Murat Karabacak, Tampa, FL (US); Gokhan Mumcu, Tampa, FL (US); Huseyin Arslan, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 16/847,425

(22) Filed: Apr. 13, 2020

(65) Prior Publication Data

US 2020/0243981 A1 Jul. 30, 2020

Related U.S. Application Data

(62) Division of application No. 16/231,583, filed on Dec. 23, 2018, now Pat. No. 10,714,836.

(60) Provisional application No. 62/631,023, filed on Feb. 15, 2018.

(51) Int. Cl.
*H01Q 15/00* (2006.01)
*H04B 7/0456* (2017.01)
*H01Q 15/04* (2006.01)

(52) U.S. Cl.
CPC ....... *H01Q 15/002* (2013.01); *H01Q 15/0066* (2013.01); *H01Q 15/04* (2013.01); *H04B 7/0469* (2013.01)

(58) Field of Classification Search
CPC .......... H01Q 15/00; H01Q 15/04; H04B 7/04
See application file for complete search history.

(56) References Cited

U.S. PATENT DOCUMENTS

| 5,781,163 A | 7/1998 | Ricardi et al. | |
|---|---|---|---|
| 2002/0036587 A1* | 3/2002 | Martin | H01Q 3/2658 342/375 |

(Continued)

OTHER PUBLICATIONS

Brady, et al. "Beamspace MIMO for Millimeter-Wave Communications: Systems Architecture, Modeling, Analysis, and Measurements", IEEE Trans. Antennas Propag., vol. 61, No. 7, Jul. 2013.

(Continued)

*Primary Examiner* — Andrea Lindgren Baltzell
(74) *Attorney, Agent, or Firm* — Thomas | Horstemeyer, LLP

(57) ABSTRACT

Various examples are provided related to hybrid multiple-input/multiple-output (MIMO) architectures. Beam steering can be provided using lens arrays. In one example, a hybrid antenna system includes a plurality of lens antenna subarrays (LAS), each of the LAS including a plurality of antenna elements configured to selectively receive a radio frequency (RF) transmission signal from RF processing circuitry, and a lens extending across the plurality of antenna elements. The RF transmission signal can be provided to a selected antenna of the plurality of antenna elements via a switching network and a common phase shifter for transmission. The lens can be configured to steer a RF transmission generated by the selected antenna in a defined direction. The selected antenna can be determined by the switching network configuration.

4 Claims, 16 Drawing Sheets

(56) References Cited

U.S. PATENT DOCUMENTS

2014/0347230 A1* 11/2014 Ohmae .................. G01S 3/046
                                                   343/703
2017/0062948 A1   3/2017 Artemenko et al.
2018/0069605 A1   3/2018 Gharavi et al.
2018/0269576 A1*  9/2018 Scarborough ............ H01Q 3/14
2019/0181926 A1   6/2019 Liang et al.

OTHER PUBLICATIONS

Mendez-Rial, eta l., "Hybrid MIMO Architectures for Millimeter Wave Communications: Phase Shifters or Switches?", IEEE Access, vol. 4, pp. 247-267, 2016.

* cited by examiner

FIG. 10C
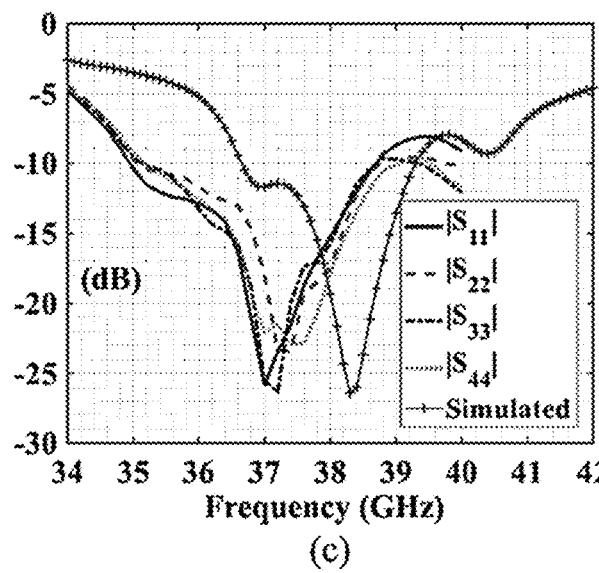
(c)
FIG. 10D
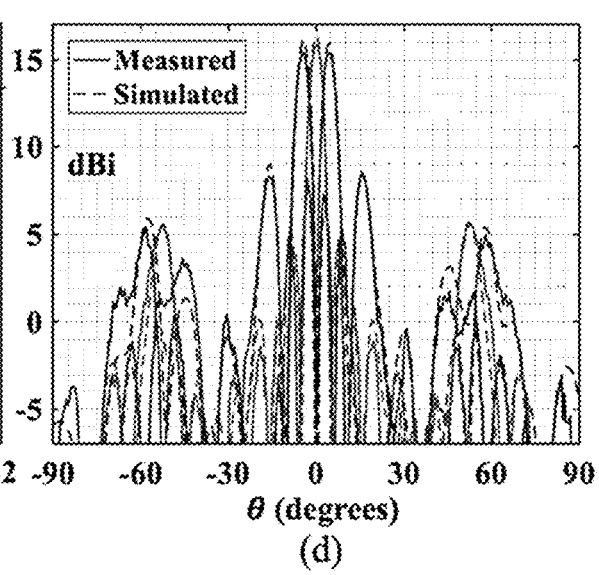
(d)
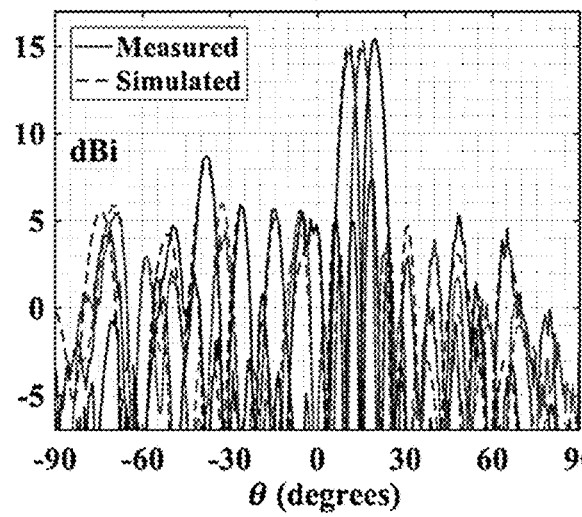
FIG. 10E
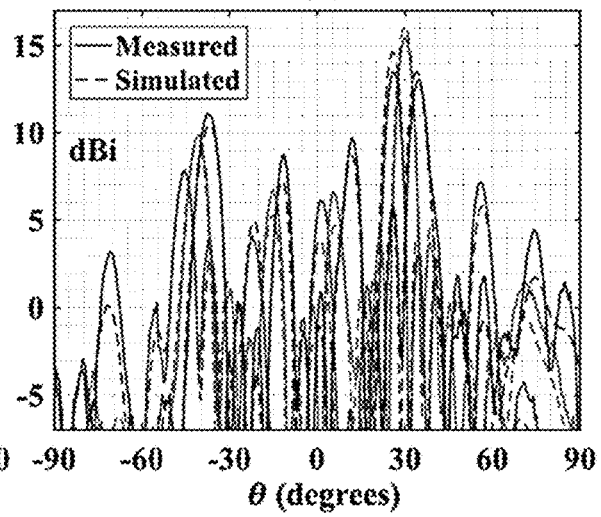
FIG. 10F

HYBRID MIMO ARCHITECTURE USING LENS ARRAYS

CROSS REFERENCE TO RELATED APPLICATIONS

This application is a divisional of U.S. utility application entitled, "Hybrid MIMO Architecture Using Lens Arrays," having Ser. No. 16/231,583, filed Dec. 23, 2018, which claims priority to, and the benefit of, U.S. provisional application entitled "Hybrid MIMO Architecture Using Lens Arrays" having Ser. No. 62/631,023, filed Feb. 15, 2018, all of which are hereby incorporated by reference in their entireties.

BACKGROUND

Wireless communications within mm-wave bands (28, 38, 60, 73 GHz, and beyond) attract growing interest due to the diminishing availability of open spectrum in lower frequency bands. One of the recognized benefits of mm-wave communications is the opportunity to employ electrically large antenna arrays to overcome the attenuation and blockage challenges in wide area operation. Unfortunately, the cost and power consumption of mm-wave mixed signal analog/digital components can make it prohibitively expensive to utilize an RF chain and analog-to-digital/digital-to-analog converter (ADC/DAC) for each of the antenna elements in a large array to enable multiple-input/multiple-output (MIMO) signal processing in the baseband. Novel architectures capable of simultaneously addressing the challenges of cost and power have the potential for broad impact in the next generation of wireless systems.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 9B-9C and 10C-10F illustrate performance characteristics of the antenna array of FIGS. 9A and 10A-10B, in accordance with various embodiments of the present disclosure.

DETAILED DESCRIPTION

Figure 1A:
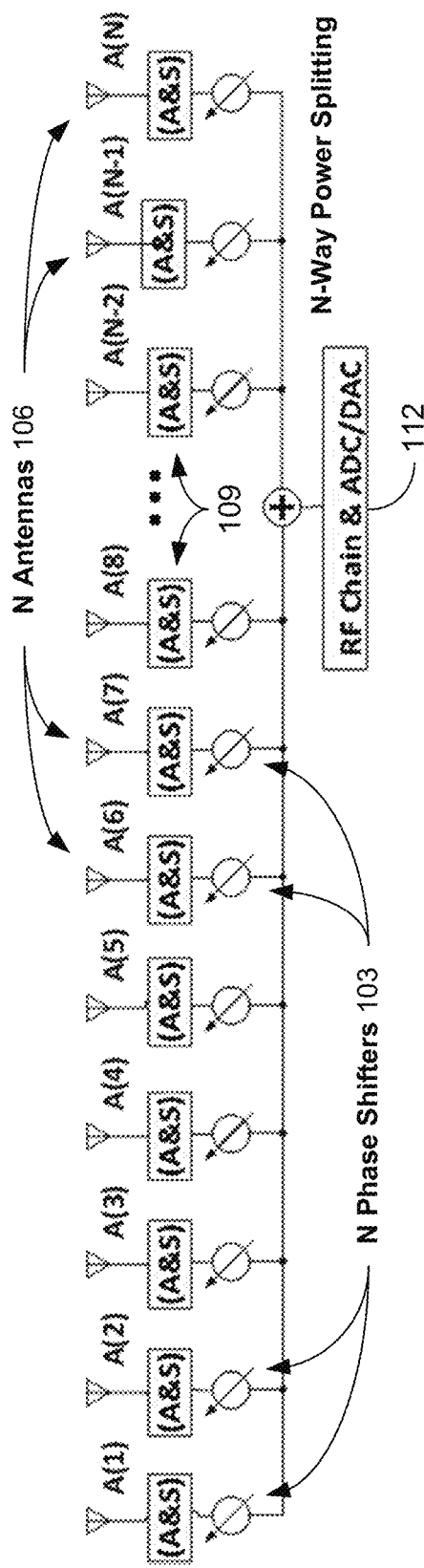
FIGS. 1A-1C illustrate examples of phased array architectures, in accordance with various embodiments of the present disclosure.

Disclosed herein are various examples related to hybrid multiple-input/multiple-output (MIMO) architectures. Beam steering can be provided using lens arrays. The data-rate impact of such architectures can be considered from the MIMO signal processing perspective to optimize the system performance. One feature of millimeter (mm)-wave communications is high-gain antenna arrays for overcoming the attenuation and blockage challenges. Unlike the lower frequency bands, cost and power consumption of analog-to-digital and digital-to-analog (ADC/DAC) components prohibit realizing mm-wave MIMO architectures fully in the baseband. Reference will now be made in detail to the description of the embodiments as illustrated in the drawings, wherein like reference numbers indicate like parts throughout the several views.

Figure 1B:
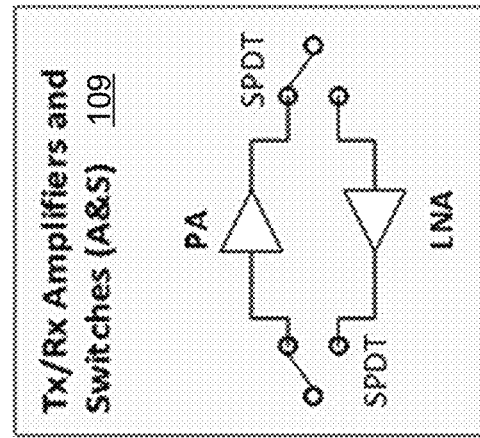

Analog beamforming is a natural choice for alleviating the challenges of accommodating power hungry RF chains and ADC/DAC for each antenna element. FIG. 1A is a schematic diagram illustrating an example of a traditional phased array (TA) architecture with variable phase shifters 103 that can be used for analog beamforming. In this architecture, beamforming is accomplished by including a phase shifter (PS) 103 per antenna element 106. Phase shifters 103 are typically followed by transmit/receive A&S (amplification and switch) stages 109 to meet radiated and/or received power requirements. FIG. 1B is a schematic diagram illustrating an example of the Tx/Rx A&S 109 comprising single-pole double-throw (SPDT) switches for coupling a power amplifier (PA) or low noise amplifier (LNA). Due to the significant reduction in radio frequency (RF) chain and ADC/DAC 112 number (e.g., reduction down to one as shown in FIG. 1A) the power consumed by the phase shifters 103 (and their variable gain amplifiers) of large format traditional arrays becomes an important power efficiency consideration. Larger antenna arrays are also expected to need phase shifters 103 with more bit states and lower quantization errors to achieve desired beamforming performance, further exacerbating the power efficiency issue. Most importantly, the data rate of the traditional phased array architecture is ultimately limited due to the inability to support simultaneous multiple MIMO stream transmissions.

Figure 1C:
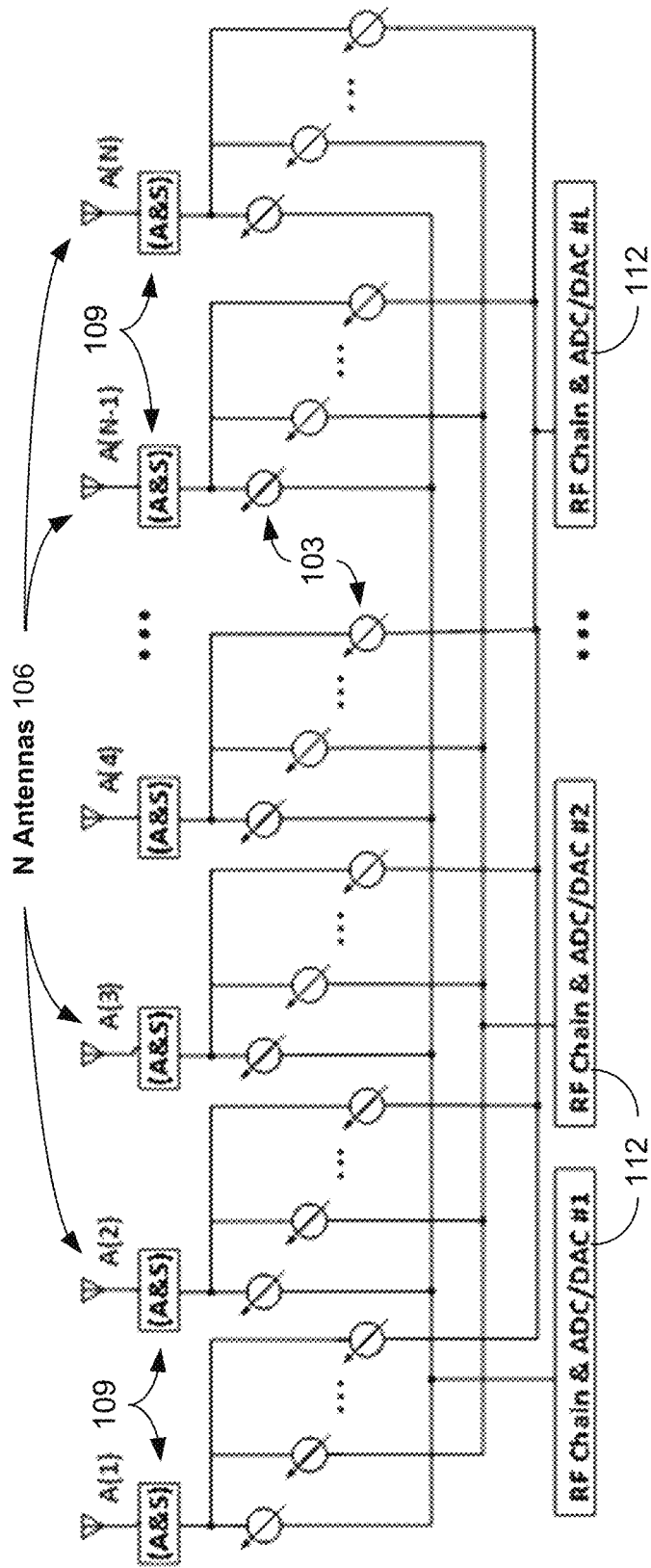

The desire to provide multiple MIMO stream transmissions while maintaining a reduced number of RF chains and ADCs/DACs has led to the introduction of hybrid MIMO architectures. The usual hybrid MIMO architecture is based on the traditional phased array approach as shown in FIG. 1C. Here, the RF signal from each RF chain 112 (a total number of L) is split into antenna elements 106 (a total number of N) and passed through phase shifters 103 before the antenna interface. Hence, the total number of phase shifters 103 ($N_{PS}$=NL) and power consumption dramatically increase. This usual hybrid MIMO architecture is essentially a superposition of L phased arrays with each RF chain having the capability to form and steer the narrowest possible beam with the aid of its own phase shifter network (i.e., RF precoder/combiner).

More recently, the high power consumption and complexity of hybrid MIMO architectures motivated the consideration of alternative architectures that exhibit reduced number of phase shifters or replace phase shifters with more energy efficient switches. The spectral efficiencies of these alternative architectures have been evaluated as a function of the number of RF chains by introducing suitable MIMO channel estimation algorithms. In addition, a power consumption model relying on expected dissipated power in hardware components has been introduced to characterize the efficiency trade-offs among these alternative architectures. Spectral efficiency of the usual hybrid MIMO architecture has been found to be significantly superior, thereby achieving capacity of the channel with the fewest number of RF chains. However, for equal power consumption, all considered alternative architectures and the usual hybrid MIMO architecture have been found to perform with close spectral efficiencies. This is due to the fact that the alternative architectures consumed less power per RF chain, offered less capacity per chain, but captured the channel capacity with increasing number of RF chains. Larger number of RF chains (in comparison to the usual hybrid MIMO) in turn increased the power consumption and negated the power efficiency benefit offered by the architecture.

Investigation of the alternative hybrid MIMO architectures has shown that the hardware variations prohibit the capability of RF chains to form and steer the narrowest possible beam since phase shifters exist only for a subset of antennas or are removed and/or replaced in favor of switches. Hence, these alternative architectures result in a reduced spectral efficiency per RF chain. This disclosure introduces a novel hybrid MIMO architecture that addresses the outstanding challenges of mm-wave networks: a superior spectrum efficiency under equal power consumption and cost effective hardware integration. Specifically, a lens antenna subarray (LAS) architecture is proposed to strategically reduce the number of phase shifters and introduce energy efficient switches.

Figure 2A:
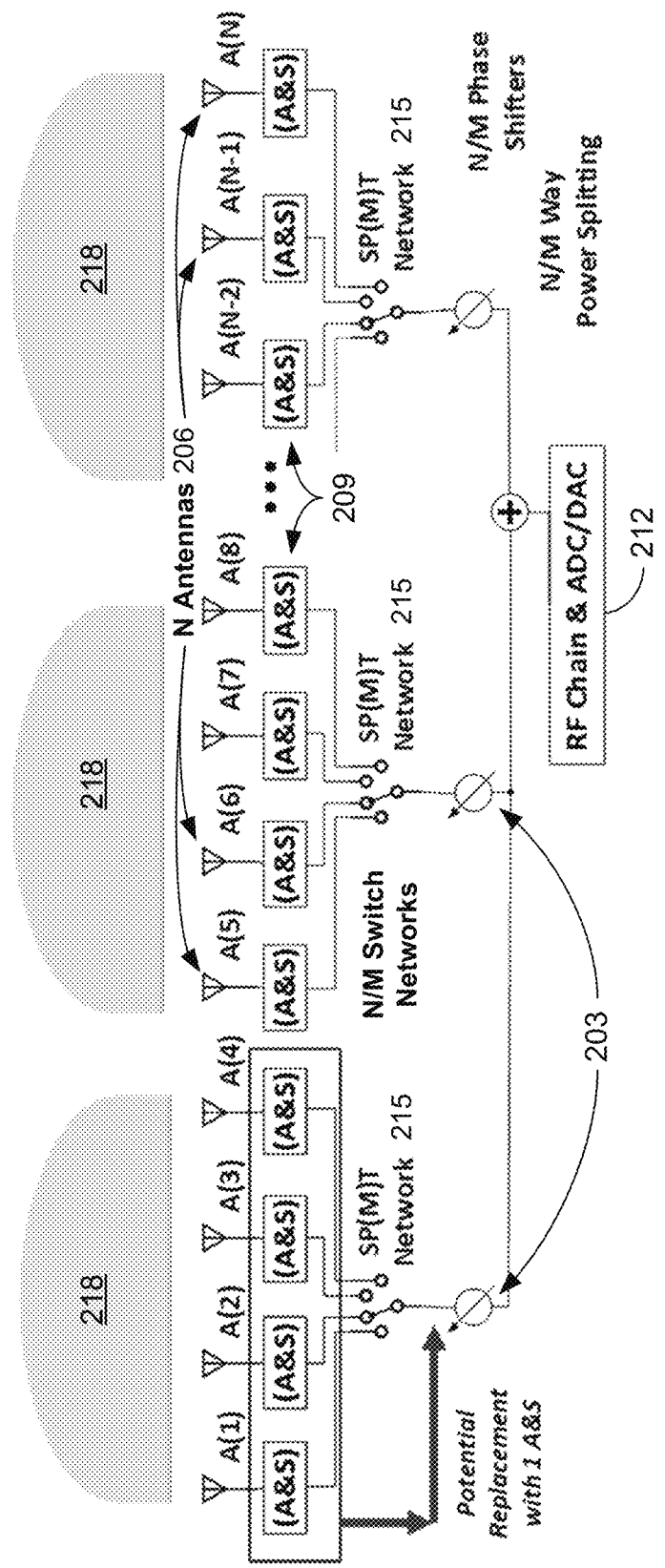
FIGS. 2A and 2B illustrate examples of lens antenna subarray (LAS) architectures, in accordance with various embodiments of the present disclosure.

FIG. 2A is a schematic diagram illustrating an example of a millimeter (mm)-wave lens antenna subarray (LAS) architecture with variable phase shifters and SP(M)T (single-pole multi-throw) switch networks. The architecture offers significant flexibility for making trade-offs between the total number of switches 215 and phase shifters 203 by adjusting the number of antennas 206 placed under each lens 218 (M). Each lens 218 is essentially a sub focal plane antenna array within the entire array composition: switching on an antenna generates a high gain beam towards a particular direction. The beams that can be generated by the antennas 206 under a lens 218 overlap to provide a continuous beam-steering field of view (FoV).

Figure 2B:
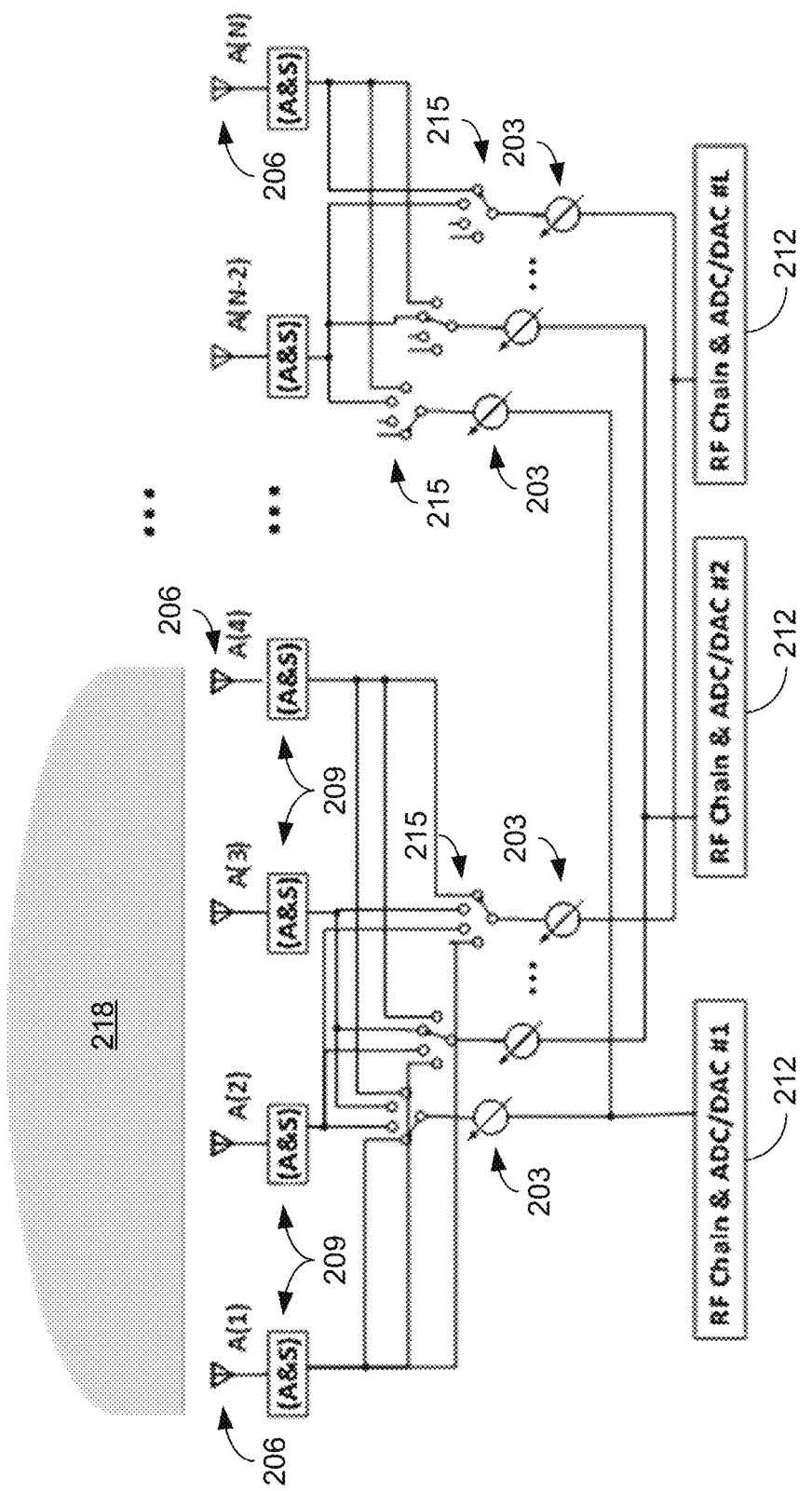

For the same antenna aperture size, the LAS provides significant reductions in total phase shifter 203 count by resorting to antenna select switches 215 while providing the electronic beam-steering and beamwidth (i.e., gain) performance. LAS hardware configuration depends on the number of antennas per lens (M). The arraying of lens antenna subarrays and properly adjusting the phase of radiation via phase shifters 209 provides array gain (in addition to lens gain) and can capture the identical beamwidth performance that can be attained from the traditional phased array. Hence, LAS offers electronic beam-steering, array gain, and narrow beamwidth performance like the usual hybrid MIMO architecture while utilizing significantly fewer phase shifters to achieve a low power consumption, low-cost, and small area circuitry. FIG. 2A depicts a scenario with an antennas per lens ratio of M=4. LAS and TA hardware needs are directly proportional to the RF chain number (L). FIG. 2B is a schematic diagram illustrating an example of a hybrid MIMO architecture with the mm-wave lens antenna subarray (LAS) architecture. The RF signal from each RF chain 212 (1, 2, . . . L) is split into antenna elements 206 (a total number of N) and passed through phase shifters 203 and antenna select switches 215.

Note that the classical lens antenna array (LAA) approach uses a single lens with no phase shifters but an N-way switch. Although this seems advantageous due to the removal of all phase shifters, the LAA technique is impractical for multiple reasons: a) for large array sizes, a very large lens is needed and the focal plane is deep into the lens aperture implying a high profile assembly; b) all radiated power needs to pass through a single antenna which stretches the demand on power amplifiers and power handling of Tx/Rx switches in the A&S blocks. The LAS architecture allows adjustment of radiated power per lens and can lead to further RF hardware simplification by reducing the number of A&S blocks. A hardware simplification is illustrated in FIG. 2A where, e.g., the Tx/Rx A&S 209 coupled to the antennas 206 for the leftmost lens 218 can be consolidated into a single Tx/Rx A&S 209 coupled between the phase shifter 203 and the switching network 215. For mm-wave MIMO architectures, the LAS based hybrid MIMO architecture offers lower pore, higher spectral efficiency and security. For equal power consumption, the LAS based hybrid MIMO can achieve higher spectral efficiency. New estimation and system algorithms can be used for LAS. For mm-wave arrays in hybrid MIMO with an N element array and L RF chains, an M element per lens architecture results in (N*L)/M phase shifters and SP(M)T switch networks which can provide significant savings in power (e.g., >3×), smaller IC area, and lower costs.

Many of the existing MIMO algorithms do not jointly consider hardware requirements and limitations in the RF domain. However, alternative MIMO architectures have been investigated in terms of hardware limitations by considering power efficiency criteria. Unfortunately, these have failed to achieve increases in spectral efficiency under identical power consumption. In addition, the MIMO architecture investigations often do not pay sufficient attention to the importance of the integration/assembly/test studies. Therefore, other realistic and potentially serious issues (e.g., beyond the power consumption of individual IC units) continue to remain unaccounted for. For example, the usual hybrid MIMO architecture for N antennas utilizes multiple of N:1 power splitting/combining hardware in the RF domain, which can be quite a significant challenge by itself for protecting the overall hardware power efficiency.

The proposed LAS architecture offers a solution to these issues, since power splitting is reduced by the number of lens elements and the switch networks effectively take care of the remaining splitting/combining functionality. Similar to this example, a major contribution of this disclosure is to establish a superior but practical mm-wave network by jointly considering, optimizing, and/or linking the system and hardware through a unification of communication, RF hardware, IC and packaging perspectives. This can result in low-cost, power-efficient, and spectrally-efficient mm-wave networks.

This disclosure will detail designs with volumetric lenses above the antenna elements. However, there are other RF circuits/networks that can be connected to antennas to achieve beam-steering with switches without needing phase shifters. These networks (usually referred to as RF/microwave beamforming networks) can also be placed below and connected to the antennas to achieve a lower profile design and implement the LAS based Hybrid MIMO architecture.

Examples of such RF/microwave beamforming networks include Rotman lenses and Butler matrices.

Power consumption in traditional hybrid MIMO and alternative hybrid MIMO architectures has been investigated by considering the number of total hardware components (e.g. phase shifters, switches) and typical power consumption expected from these components. A wide range of power consumption values can be observed and power consumption of particular hardware can be selected based on certain justifications such as average value, expected trend in future years, etc. Here, a similar approach was taken at the component level to evaluate the power consumption trends of proposed lens antenna subarray (LAS) based and traditional phased array (TA) based architectures. First, these architectures were compared by assuming a single RF chain and ADC/DAC, e.g., using the architectures in FIGS. 1A and 2A with L=1. The desired effective isotropic radiated power (EIRP) were set to 45 dBm based on existing/expected standards. The peak broadside gain of a traditional linear patch antenna array (TAG) can be calculated by assuming a 90% aperture efficiency ($\eta_{TA}$) as TAG=$(4\pi/\lambda^2)A_p\eta_{TA}$, where $A_p$ stands for the footprint area. The $A_p$ is linearly proportional to the element number N and element spacing d that is taken as d=$\lambda$/2 with $\lambda$ representing wavelength.

Figure 3A:
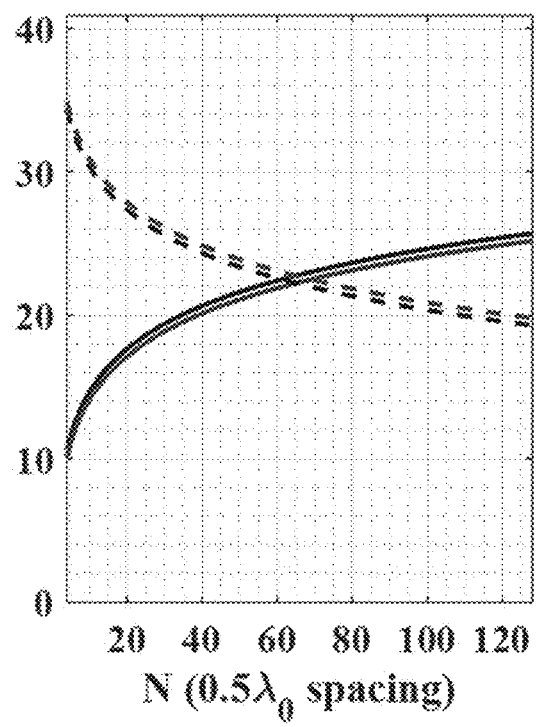
FIGS. 3A-3D, 4A-4B and 5A-5B illustrate characteristics of the LAS architectures of FIGS. 2A and 2B, in accordance with various embodiments of the present disclosure.

The aperture efficiency of extended hemispherical or slab dielectric lenses is as high as patch antenna arrays when compared with respect to the "footprint of lens base (=$A_p$)". Due to the lens/air mismatch and attractiveness of using low-cost (but with slightly higher loss) materials such as ABS, aperture efficiency of LAS ($\eta_{LAS}$) can be set to 80% and gain was evaluated as LASG=$(4\pi/\lambda^2)A_p\eta_{LAS}$. In the case of cylindrical dielectric slab lenses, $A_p$ of LAS and TA are equal as the arrays have the same physical footprint. Total transmit power can therefore be evaluated as $TxP_{TA}$=EIRP-TAG(dB) and $TxP_{LAS}$=EIRP-LASG(dB). FIG. 3A depicts examples of array gains and transmit powers needed for both architectures (Tx power for 45 dBm EIRP and gain of TA and LAS) as a function of N. Array elements N=20 corresponds to 16 dBi gain and agrees with the characterized gain of the preliminary prototype shown in previous section. For N=64, the gain for each approach is about 23 dBi and the needed power is about 23 dBm.

Figure 3B:
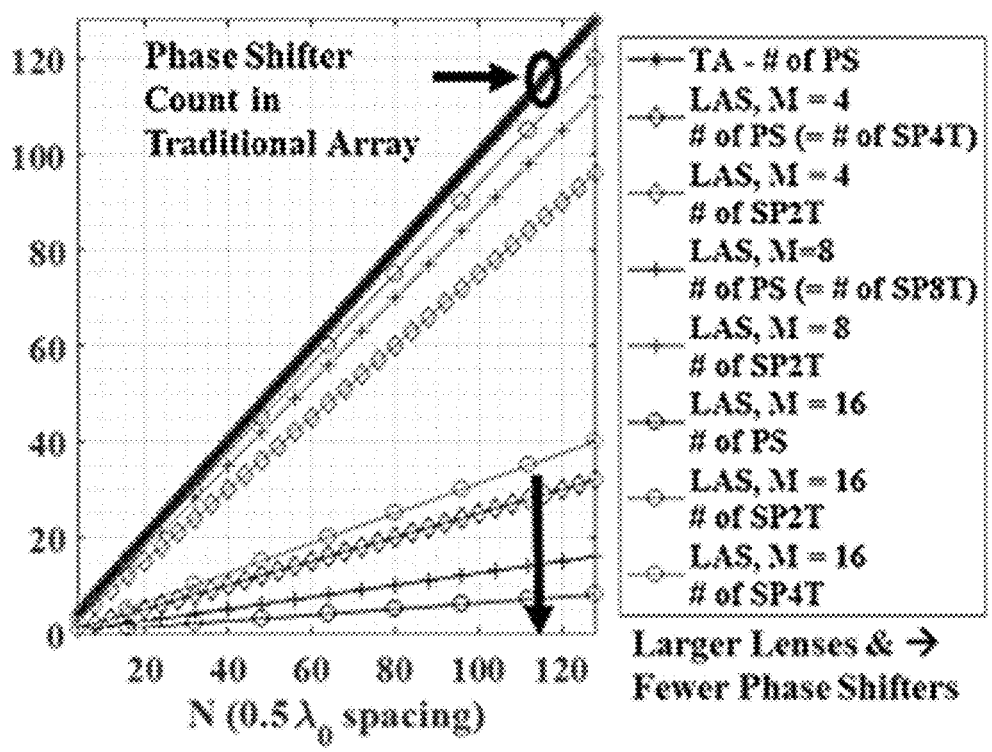

FIG. 3B depicts examples of the total number of hardware components (switches and phase shifters) needed by the two architectures (TA and various LAS implementations with L=1 RF chain). For the TA, the switch count is assumed to be zero and all signal routing is achieved through power divider/combiner networks. The LAS can be implemented in various ways. Consider the possibility of using SP2T, SP4T, and SP8T switches for M antenna per lens cases of 4, 8, and 16. Assume a switch insertion loss of $IL_{SP(M)T}$=1 dB, which is a conservative value expected from the IC process utilized. The IL introduced by the SP2T implementations is higher due to the need for using multiple switches in series. For example, SP4T and SP8T switch functionalities can be implemented with a total of 3 and 7 SP2T switches and IL of 2 dB and 3 dB, respectively. FIG. 3B demonstrates that the numbers of phase shifters and switches decrease with larger M as expected. As compared to the traditional array (TA), a significant reduction is achieved in total phase shifters. For N=64, the TA utilizes 64 phase shifters while the M=4 LAS uses 16 phase shifters.

The power consumption of the TA architecture can be estimated as $P_{TA}$=$TxP_{TA}/\eta_{PAPS}$+$NP_{PS}$+$P_{RFC}$, where $\eta_{PAPS}$ stands for the efficiency of the transmit amplifier and phase shifter in series, $P_{PS}$ stands for power consumption of phase shifters, $P_{RFC}$ stands for the power consumed in the RF chains and ADC/DAC. LAS is expected to provide further advantage in the IL of N-way power dividers since switches also perform power division. The efficiency $\eta_{PAPS}$ is independent of the number of Tx/Rx A&S blocks and phase shifters, as the total transmit power is divided and passed through a single block. Phase shifters are in general implemented as active or passive devices. Although passive phase shifters in theory can provide negligible power consumption, in practice they are combined with a variable gain amplifier (VAG) to balance the IL variation among their phase shifting states. Hence, active or passive phase shifters contribute to the power consumption significantly in very large arrays and in hybrid MIMO architectures.

Figure 3C:
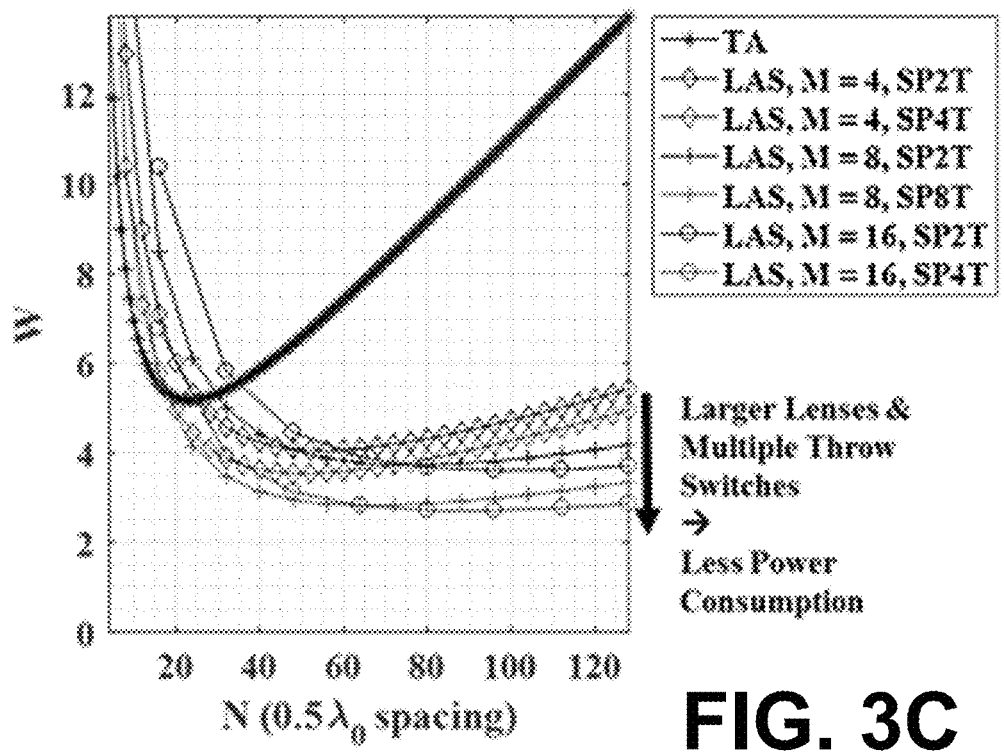
Figure 3D:
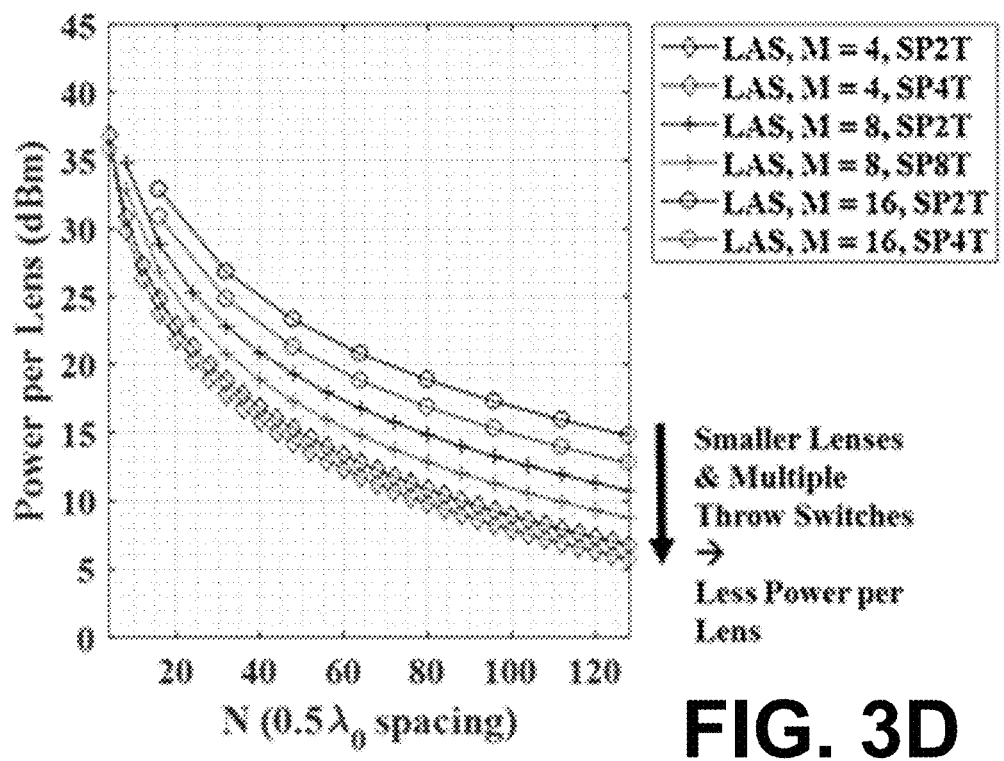

FIG. 3C illustrates examples of power consumption in TA and LAS architectures with L=1 RF chain. The curves shown in FIG. 3C are generated with $\eta_{PAPS}$=0.2, $P_{PS}$=100 mW, and $P_{RFC}$=500 mW. The $P_{RFC}$ was taken as significantly higher than $P_{PS}$. The $P_{PS}$ was based on commercially available phase shifters. The $P_{sp2T}$ was taken significantly lower as $P_{SP2T}$=10 mW. For power consumption of larger throw switches, $P_{SP4T}$=20 mW and $P_{SP8T}$=40 mW were used. The power consumption of the LAS implementation with M antennas per lens was calculated as $P_{LAs}$=$TxP_{LAS}$/$(\eta_{PAPS}\eta_{SP(M)T})$+(N/M)$P_{PS}$+$N_{SP(M)T}P_{SP(M)T}$+$P_{RFC}$, where $N_{SP(M)T}$ represents the total number of SP(M)T switches (or switch networks) and $\eta_{SP(M)T}$ stands for the efficiency of the switches. This is related to the switch IL as $\eta_{SP(M)T}$=$10^{(-mIL_{SP(M)T}/10)}$ with m representing the number of series switches needed to implement the architecture. FIG. 3C demonstrates that for small arrays with N<30, the efficiency of amplifiers and phase shifters dominates the power consumption. However, for larger arrays, power consumption in control components is the dominant contributor and larger lenses with more multiple throw switches offer better power savings. FIG. 3D illustrates an example of the Tx power needed to be generated under each lens within LAS architecture. FIG. 3D demonstrates that the RF power per lens also increases with lens size, stretching the A&S requirements and potentially prohibiting the use of one A&S per lens. Hence, lens size must be strategically selected to provide the best hardware implementation in terms of efficiency and cost.

Take-aways from the foregoing analysis are that power consumption reductions >30% are possible for N>28 (FIG. 3C) and lower $P_{PS}$ values do not alter the fact that significant power savings are achieved by LAS in large array settings. For example, $P_{PS}$=50 mW achieves >30% power consumption reduction for N>40. The power savings achieved by the LAS architecture further increases with the number of RF chains. Power consumption in usual hybrid MIMO with L chains can be modeled as $P_{TA(L)}$=$TxP_{TA}/\eta_{PAPS}$+$LNP_{PS}$+$LP_{RFC}$. Power consumption in LAS based architecture can be modeled as $P_{LAS(L)}$=$TxP_{LAS}/(\eta_{PAPS}\eta_{SP(M)T})$+L(N/M)$P_{PS}$+$LN_{SP(M)T}P_{SP(M)T}$+$LP_{RFC}$.

Figure 4A:
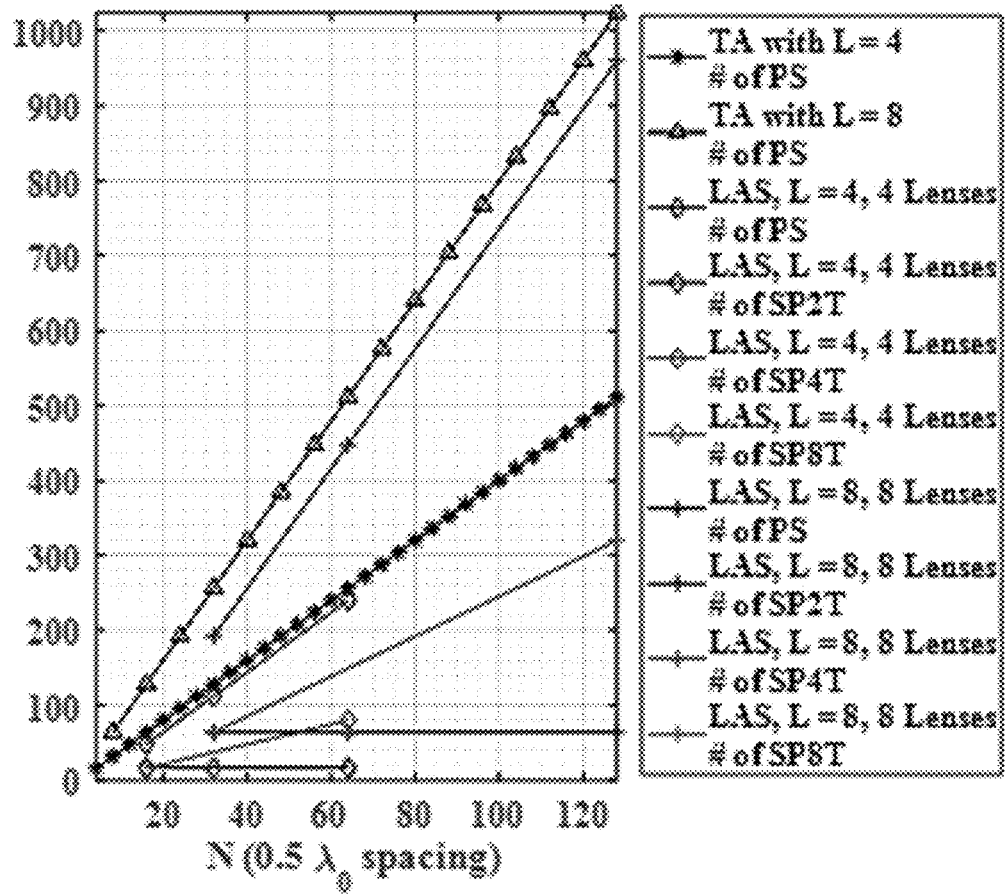
Figure 4B:
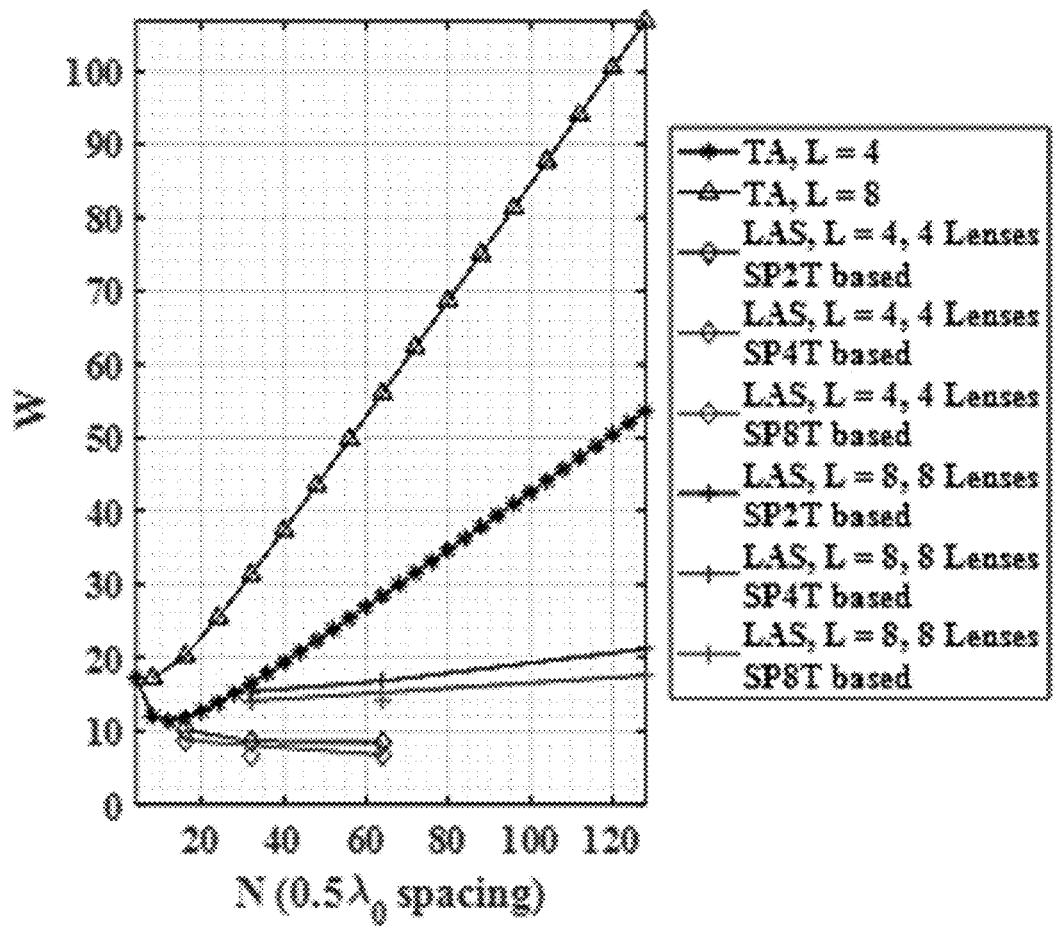

FIGS. 4A and 4B demonstrate examples of the hardware count and power consumption of L=4 and L=8 hybrid MIMO architectures. FIG. 4A shows total number of components needed by traditional array (TA) and various LAS implementations with L=4 and L=8 RF chains and FIG. 4B shows the power consumption in TA and LAS architectures with L=4 and L=8 RF chains. LAS architectures were selected to exhibit identical total lens and RF chain numbers. To demonstrate fewer data points with more clarity, the total number of lenses in LAS was set to be equal to the number of RF chains (i.e. N/M=L). FIG. 4B depicts that the traditional hybrid MIMO power consumption becomes heavily dominated by the phase shifters with increasing L; for N=64 the power for L=4 and L=8 TA designs is 30 W and 56 W, respectively. Significant power savings can be achieved by the LAS architecture even in small array settings. For example, the power consumption ratio between traditional array and LAS based hybrid MIMO is >2:1 for N=32 and L=8 when LAS is implemented with M=4 elements per lens, N/M=8 lenses and SP4T switches.

The proposed LAS hybrid MIMO architecture provides the flexibility to realize large antenna arrays with various lens sizes. For M=N, the LAS architecture employs only a single lens. For small values of M (i.e. M<<N), LAS architecture gets closer to the traditional phased array. Hybrid MIMO systems that have control over individual antenna elements forming the radiating aperture can take advantage of analog precoding and/or combining to align angularly spread multiple channel paths to increase power gain. This is in contrast to the beamforming approach that focuses beams only towards the best channel path that maximizes power. Hence, the LAS architecture operated with analog precoding/combining naturally outperforms the beamforming approach based on a single lens. It is important to identify a LAS architecture with optimum M value based on joint investigations on spectral efficiency, power consumption, and hardware implementation complexity (i.e power per lens). The case of M=1 implies a traditional array, but is inefficient in power consumption.

As an example, consider an N=64 element LAS architecture with M=4, 8, 16 and 64 to demonstrate that multiple focused beams offered by small lenses still offer a competitive (within 10%) spectral efficiency with respect to the traditional antenna array (M=1) when their beams are properly precoded and combined. For demonstration, a NYU channel simulator was used under non-line-of-sight (NLOS) 28 GHz scenario to generate random wireless channels. Users were randomly distributed between 60 m to 200 m from the transmission point and the channel for the users were provided by the simulator. Antenna capabilities of the architectures (e.g., gains, beamwidths, and array factors) and channel dispersion characteristics (e.g., angular power dispersion, multipath clusters, multipath phases, and path loss) were also modeled. Using this channel information, precoding matrices were calculated and received power by the users were determined along with their data rates.

Figure 5A:
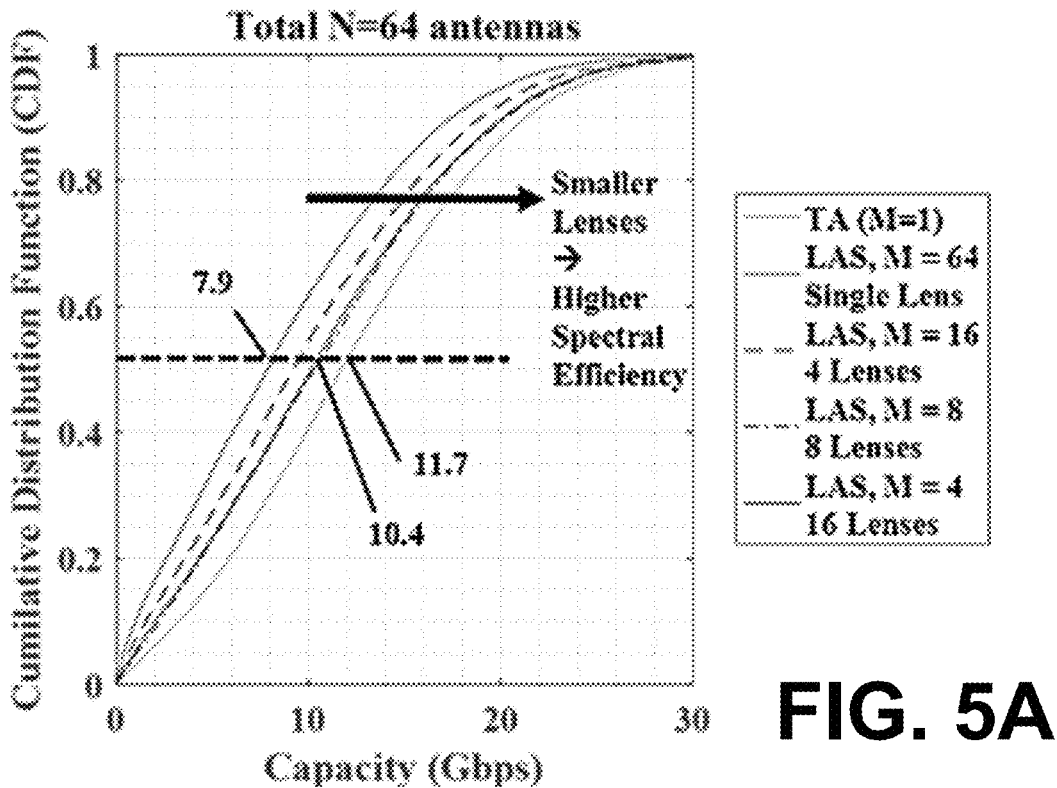
Figure 5B:
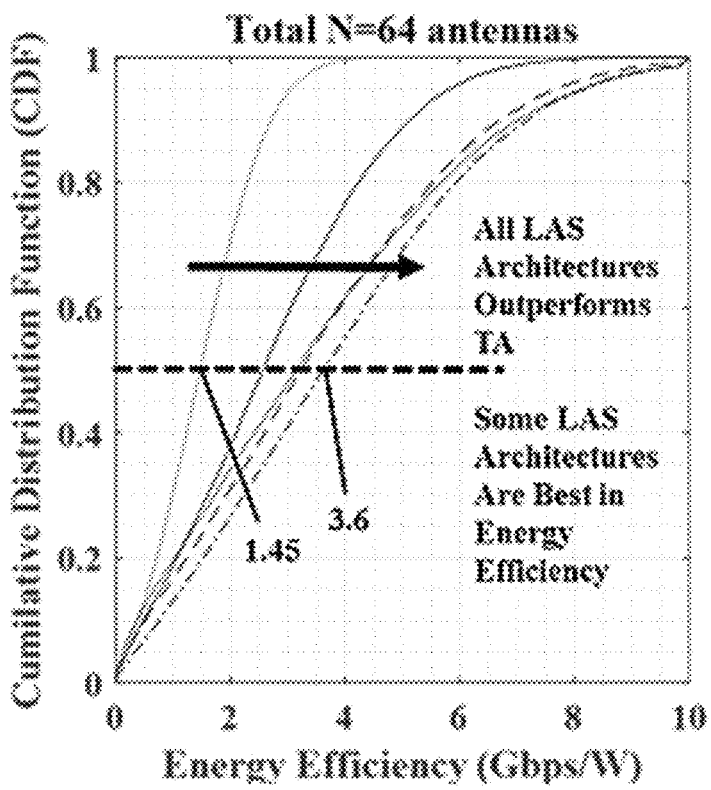

FIGS. 5A and 5B, shown are examples of user capacity distribution in the modeled NLOS mm-wave environment using a traditional array (TA) and various LAS implementations with M=4, 8 and 16; and corresponding energy efficiency distribution, respectively. LAS architectures outperform the TA by more than 2:1 with some configurations being better than others. FIG. 5A illustrates the cumulative distribution (CDF) of the capacity of the users for 2 GHz bandwidth with 45 dBm EIRP (in accordance with previous section's power consumption studies). It is observed that the traditional array offers the best capacity in NLOS as expected. LAS architectures with smaller lenses (M=4 and M=8) almost offer the same spectral efficiency by being within 10% of that capacity. However, larger lenses suffer in these NLOS situations. As such, the single lens (M=64) offers only 67% of the TA capacity. The benefit of the LAS architecture is clearly observed when energy efficiency (i.e., data rate per Watt) is considered. FIG. 5B was obtained by dividing data rates of FIG. 5A with power consumption evaluated in FIG. 3C. All LAS architectures are capable of providing better spectrum efficiency under equal power consumption. Due to the variations in hardware implementation and data rates, some LAS architectures seem to be optimum (e.g., M=8 with 3.6 Gbps/W). Significant improvement in energy efficiency may be achieved by replacing TA (1.45 Gbps/W) with LAS.

As previously discussed, the power consumed by the PSs 103 (and their amplifiers) can become prohibitive in large antenna arrays. This problem is exacerbated in traditional hybrid MIMO architectures (FIG. 1A) since the number of PSs 103 becomes a multiple of the number of ADC/DACs employed within the architecture. Besides these recent considerations, the PS related hardware complexity has long been recognized as a challenge. For example, switched beam antennas utilizing beamforming networks (BFNs) are found attractive due to their PS-free nature; however, these suffer from large sizes. Likewise, TAs consisting of subarrays use significantly fewer PSs 103, but steer their beams within a narrow field of view (FoV). Significant PS 103 number reduction may be achieved by introducing variable gain amplifiers to subarrays; however, this approach still exhibits a narrowed FoV and is likely to suffer from power consumption issues in large array settings.

Microwave lenses can be utilized to realize PS-free switched beam antennas, but they can be unattractive due to their size and high-profile focal surface array assembly. For beam steering arrays, transmit and receive (Tx/Rx) amplifier and switch (A&S) placement is also a consideration. In TAs and BFN/lens-based switched beam antennas, the PS losses and switch power handling capabilities usually need the A&S blocks to be placed behind each antenna element.

Figure 6:
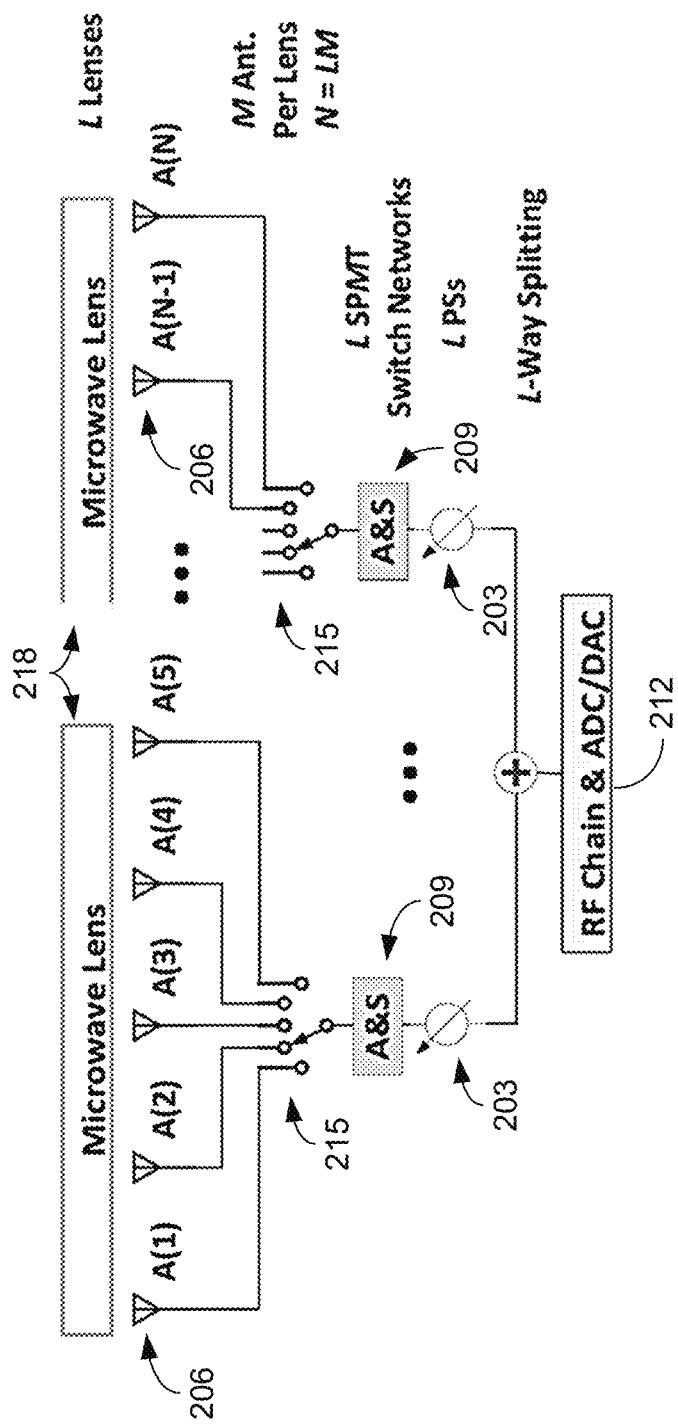
FIG. 6 illustrates an example of a LAS architecture, in accordance with various embodiments of the present disclosure.

A novel mm-wave beam steering antenna comprising lens antenna subarrays (LASs) is introduced. FIG. 6 shows an example of the LAS-based antenna with Tx/Rx A&S 209 positioned between the PS 203 and SP(M)T switch networks 215. As depicted in FIG. 6, each LAS hosts M=5 antennas to form a switched beam array. A total of L LASs are interfaced with L PSs to realize a similar beamwidth performance with a TA having a similar number of antenna elements (N≈LM). The choice of M allows tradeoffs among the switch network throws, PS numbers, lens size, and power per lens, thereby reducing the number of PSs 203 and potentially A&S blocks 209 as well. The combination of beam switching and steering via PSs has attracted interest for increasing FoV and providing higher steering resolution without being concerned with the number of PSs. The combination has been towards reduced PS numbers; however, a narrow FoV as in traditional subarrays is achieved due to restricting the antennas of the subarrays with 1 bit PSs. The LAS-based antenna presented in this disclosure offers an improvement by reducing the PS numbers while simultaneously maintaining a large FoV that is determined by the lens and its focal surface type (e.g., curved versus planar). An example of a LAS-based antenna at 38 GHz is demonstrated here.

Lens and Feed Antenna Design

For demonstration, a LAS-based antenna design was carried out for a scenario of N=20, M=5, and L=4. Based on the full-wave simulation of an N=20 element patch antenna based TA and aperture efficiency considerations, obtaining >15 dBi broadside realized gain with the LAS-based antenna is important to demonstrating a comparable radiation performance. The LAS-based antenna architecture in FIG. 6 implies that the FoV and bandwidth performances primarily depend on the lens and feed antennas, respectively. To utilize three-dimensional (3-D) printing, extended hemi-cylindrical dielectric slab waveguide (DSW) lenses from thermoplastic acrylonitrile butadiene styrene (ABS, $\epsilon_r$=2.6, tan δ=0.006) are selected for the design. The lens was fed by a 38 GHz aperture-coupled patch antenna exhibiting 7%

|S₁₁|<−10 dB bandwidth to be suitable for operation within the 37 and 39 GHz mm-wave bands. The patch antenna was designed to be separated from the lens by an air gap of 0.25 mm. The air gap enables mechanically moving the lens over the feed antenna and demonstrates the concept without implementing the switch network.

Figure 7A:
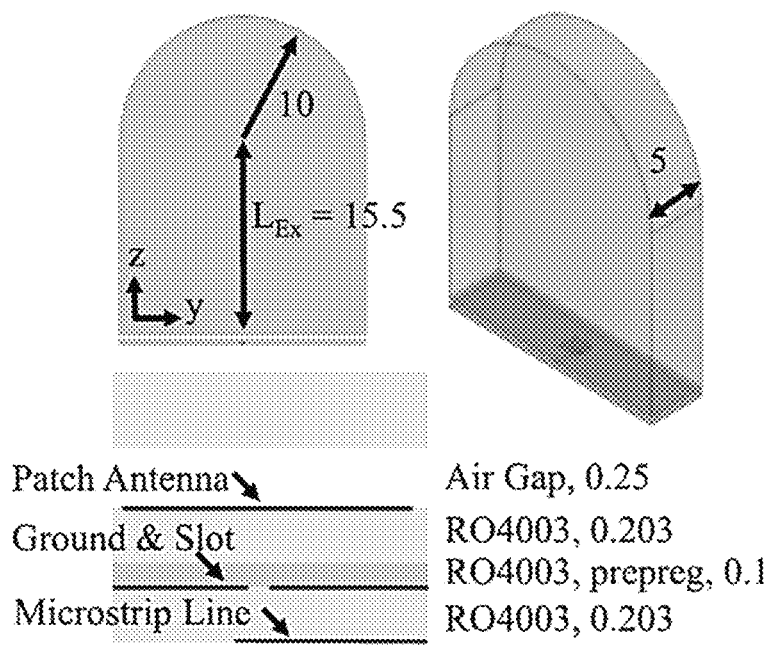
FIGS. 7A and 7B illustrate examples of lens and antenna arrangements that can be used in the LAS architectures of FIGS. 2A, 2B and 6, in accordance with various embodiments of the present disclosure.
Figure 7B:
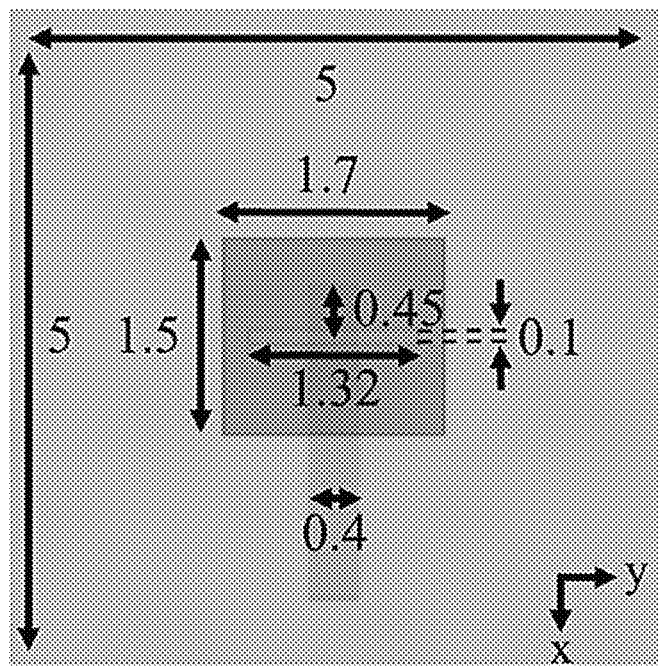
Figure 7C:
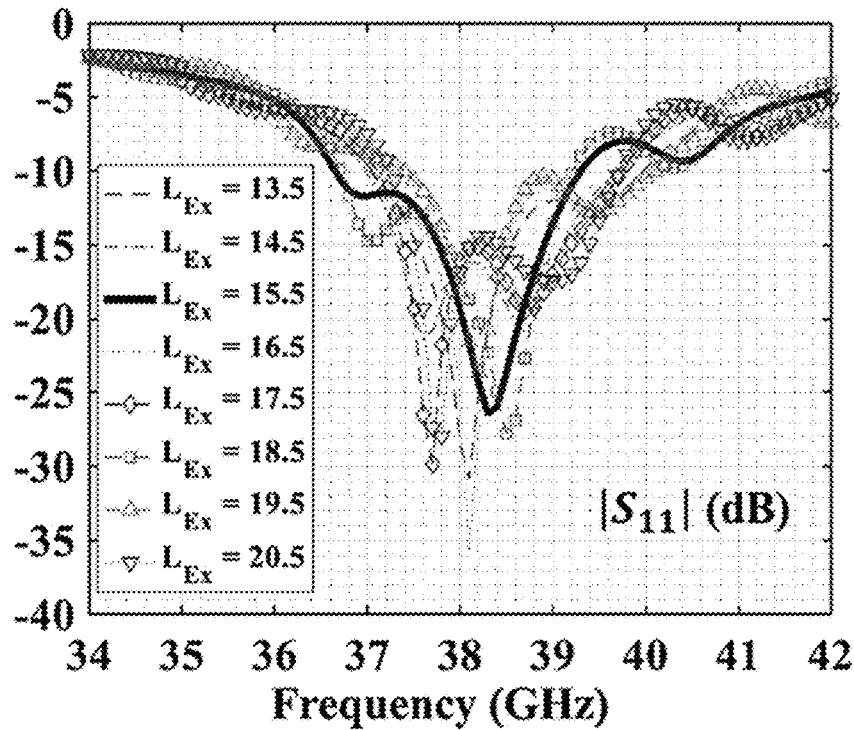
FIGS. 7C-7D and 8A-8B illustrate performance characteristics of the lens and antenna arrangements of FIGS. 7A and 7B, in accordance with various embodiments of the present disclosure.

The 50Ω microstrip feedline, ground plane, coupling aperture, and patch antenna were designed within a multi-layered printed circuit board (PCB) substrate stack-up shown in FIG. 7A, which provides the lens dimensions and substrate stack-up for the feed antenna. The substrate materials were Rogers RO4003 with $\epsilon_r$=3.35 and tan δ=0.027 (see FIG. 7A for the substrate thicknesses). In this disclosure, Ansys HFSS has been utilized as the full-wave electromagnetic simulation tool. A patch antenna design was carried out by representing the presence of the lens above the antenna with a 2 mm thick rectangular prism and enclosing the entire solution domain with radiation boundary conditions. The global material environment was set to be the ABS to model an infinitely large lens above the antenna. The designed antenna layout was found to operate well with the finite lens as well. FIG. 7B depicts the layout of the patch antenna and substrate footprint dimensions (in mm) used with the infinitely large lens model.

In the lens design, the E-plane (xz plane) of the patch antenna is aligned with the width of the lens to excite the symmetric $TM_0$ mode. The width of the lens was selected as 5 mm to be relatively large as compared to the patch antenna footprint. The lens diameter is determined as $M(\lambda_0/2) \approx 20$ mm, where $\lambda_0$=7.9 mm stands for the free-space wavelength at 38 GHz. For the selected material and thickness, the solution of transcendental equations arising from the DSW problem at 38 GHz reveals effective relative dielectric constant of the $TM_0$ mode as $\epsilon_{re}$=2.06. An initial value for the extension length $L_{Ex}$ is determined from the equations in "Double-slot antennas on extended hemispherical and elliptical silicon dielectric lenses" by D. F. Filipovic et al. (*IEEE Trans, Microw. Theory Techn.*, vol. 41, no. 10, pp. 1738-1749, October 1993) as $L_{Ex}$=13.65 mm.

Figure 7D:
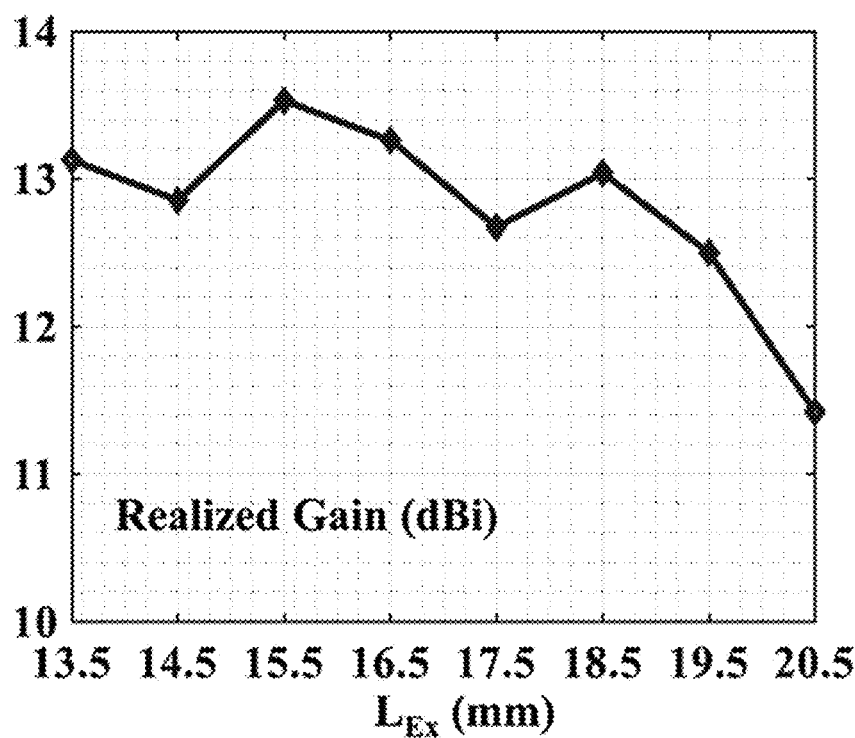

A cylindrical surface was adapted (instead of an elliptical surface) to achieve a larger FoV. For volumetric lenses, it has been demonstrated that full-wave simulations for the design and modeling of small lenses is needed. This disclosure appears to be the first to report a relatively small extended DSW lens. Therefore, the full-wave simulations were carried out to identify the $L_{Ex}$ value that maximizes the realized gain with substrate footprint of the feed antenna taken equal to that of the lens base. The parametric sweep for $L_{Ex}$ was carried out in 1 mm increments within a 13.5-20.5 mm range to keep a low antenna profile. FIG. 7O shows an example of the simulated |S₁₁| of the feed antenna within the 34-42 GHz band. As depicted in FIG. 7O, the feed antenna remains impedance-matched for all $L_{Ex}$ values. It is observed that |S₁₁| exhibits more ripples for larger $L_{EX}$ values, indicating more reflections within the lens that could potentially contribute to increased sidelobe levels. FIG. 7D presents the simulated realized gain as a function of the extension length $L_{Ex}$ of the lens at 38 GHz. $L_{EX}$=15.5 mm is selected due to its maximum gain value of 13.5 dBi. The simulated radiation efficiency is 78%.

LAS-Based Antenna Performance

Figure 8A:
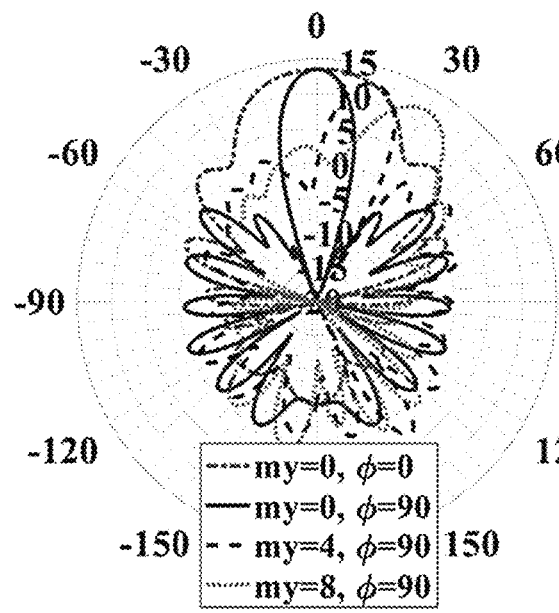

To evaluate the antenna, the beam steering performance of a single lens when its feed antenna is located at different positions (my) relative to its center axis was evaluated. Although the mechanical movement employed in the evaluated design allows positioning the feed antenna anywhere within the focal surface, determining the fewest number of antenna locations that can cover the FoV is very advantageous for switch-network-based array implementations with the lowest possible hardware complexity. The xy-plane (E-plane, φ=0°) and yz-plane (H-plane, φ=90°) simulated realized gain patterns of the feed antenna located in the middle of the focal surface (my=0) are shown in FIG. 8A. The simulated realized gain patterns are from a single lens at 38 GHz when the feed antenna is located at different positions (my). Due to the slab geometry of the lens, the E-plane gain pattern exhibits a 38° half-power beamwidth (HPBW). In contrast, the H-plane gain pattern is well focused with a 15° HPBW. The sidelobes are below 12 dB of the major beam, and their characteristics are related to the lens type and size.

Back radiation can further be minimized by utilizing cavity-backed apertures; however, this is not pursued in the presented design. Based on the 15° HPBW, the feed antenna positions (my) corresponding to beam-steering directions of 15°, 30° are of interest to generate beams with HPBW overlap and have the fewest possible antennas in a switched network implementation. Parametric simulation studies are utilized to identify these positions as my=−8, −4, 0, 4, and 8 mm. FIG. 8A also depicts the realized gain patterns for my=4 and 8 mm. Specifically, my=±4 mm and my=±8 mm result in peak realized gains of 12.45 and 11.86 dBi, respectively. Larger my values do not provide significant beam steering capability and provide increased sidelobes due to being close to the lens boundary and out of focus. The FoV of the lens can, therefore, be defined as 75° from the maximum beam-steering angle and the HPBW consideration.

Figure 8B:
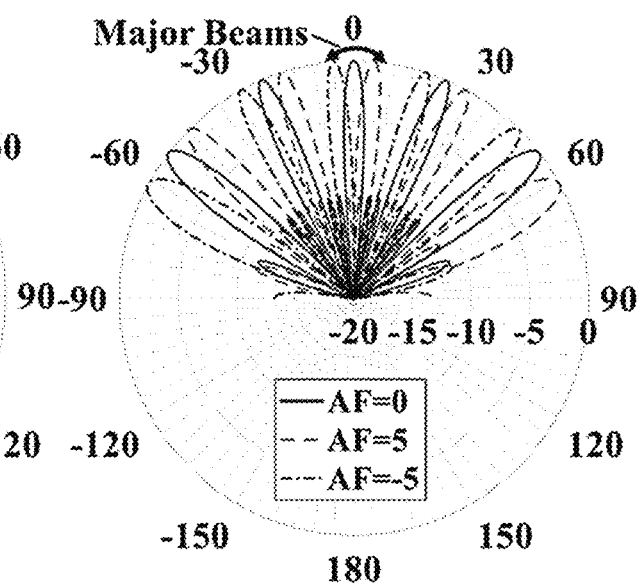

The beam steering performance of the designed antenna with L 4 can be predicted from an array theory by multiplying the single-lens gain pattern with the array factor (AF). As expected, the electrically large spacing between lenses causes the AF to exhibit grating lobes. FIG. 8B illustrates an example of the AF pattern at 38 GHz for the L=4 element LAS when the AF is steered towards −5°, 0°, and 5° directions. Negative my values generate symmetric patterns with respect to 0°, which are not shown. FIG. 8B depicts the normalized AF patterns of the L=4 antenna with 20 mm lens spacing in positive half of the H-plane when the AF is steered within the HPBW of the feed antenna located at the center of the focal surface (my=0). Since the grating lobes are out of the major beam, the high-gain nature of the antenna remains intact. Depending on the overlap between the grating lobes and sidelobes of the lens, sidelobes with narrower beamwidth are also expected. The AF exhibits 5.2° HPBW, The AF steered in 5° increments therefore results in patterns intersecting each other approximately about their HPBW. Hence, the beam steering performance of the designed antenna is depicted with representative patterns steered in 5° increments. The AF can be steered in much finer resolution based on the PS capabilities included in the LAS-based antenna architecture.

Figure 9A:
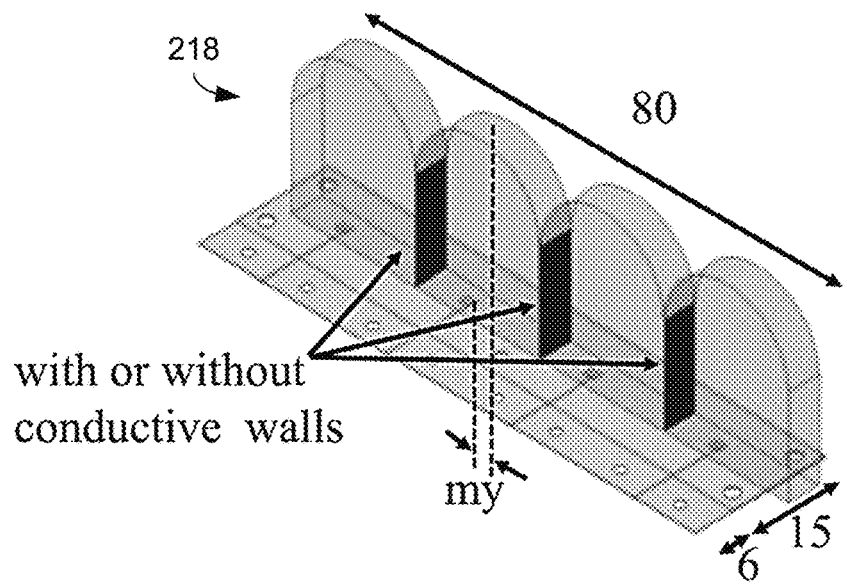
FIGS. 9A and 10A-10B illustrate an example of an antenna array using the lens and antenna arrangements of FIGS. 7A and 7B, in accordance with various embodiments of the present disclosure.
Figure 9B:
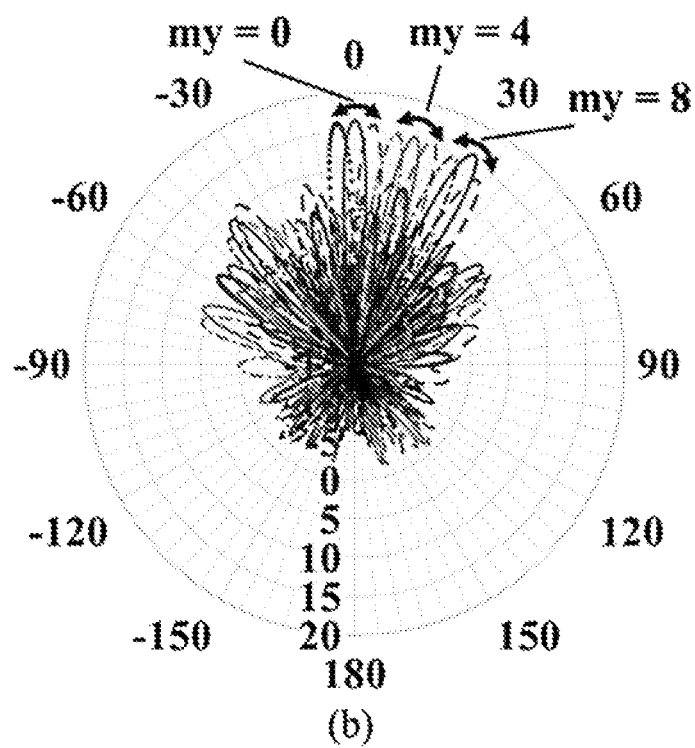
Figure 9C:
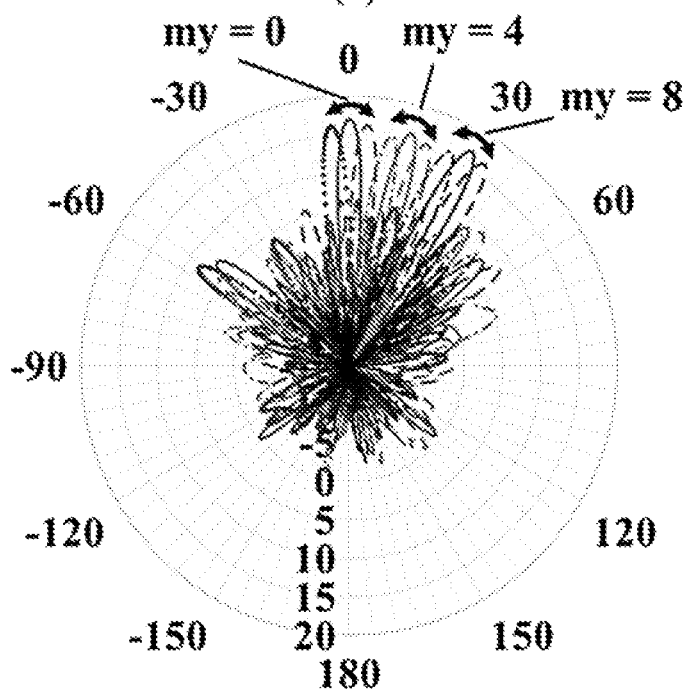

The placement of multiple lenses adjacent to each other necessitates utilizing full-wave simulations for accurately evaluating the radiation performance of the LAS-based antenna. FIG. 9A is a graphical illustration of a full-wave simulation model of the 4-element LAS-based antenna. Representative simulated realized gain patterns at 38 GHz for different my positions are shown in FIGS. 9B and 9C without and with conductive walls, respectively. Negative my values generate symmetric patterns with respect to 0°, which are not shown. As shown in FIG. 9A, the lenses 218 are in contact to utilize the smallest possible spacing (e.g., 20 mm), To accommodate the placement of 2.92 mm edge connectors for the experimental setup, the microstrip line substrate was extended by 5 mm from the edge of the 15 mm wide substrate stack-up that includes the feed antennas. The holes in the substrates were for mounting the edge connectors and a 3-D printed holder. Simulations were performed for my=0, 4, and 8 mm positions. The excitation phases were calculated to realize AF patterns with major beams within the single-lens beam steering cone (e.g., −7.5° to 7.5° for my=0, 7.5° to 22.5° for my=4 mm, and 22.5° to 37.5° for my=8 mm). The excitation phases were also rounded based on a 5-bit phase quantization. FIG. 9B presents the representative H-plane realized gain patterns steered with 5° increments. Maximum and minimum realized gains are 16.37 and 13.4 dBi for the 0° and 35° directions, respectively. The simulated radiation efficiency was 71% and slightly lower than that of the single lens. The loss from the extended feedline is a major contributor of this deviation. Within the scan range, the sidelobes are below 8.6 dBi. The worst-case simulated mutual coupling was −27.5 dB at 37.4 GHz.

For applications such as point-to-point communications, it is generally desirable to have sidelobe levels that are at or below 10 dB of the main beam. For THz focal plane arrays, one potential effect that distorts the gain pattern is the illumination of a lens surface by the feed antennas of the adjacent lenses. To investigate the possibility of reducing the sidelobe level, the vertical conductive walls have also been considered as shown in FIG. 9A. The corresponding simulated realized gain patterns are shown in FIGS. 9B and 9O. It can be observed that the sidelobes are suppressed more in a way to approach to the 10 dB level. Specifically with walls, the maximum and minimum realized gain values were 17 and 15.41 dBi for the 0° and 20° directions, respectively. Wthin the scan range, the sidelobes are below 7.0 dBi.

Experimental Verification

Figure 10A:
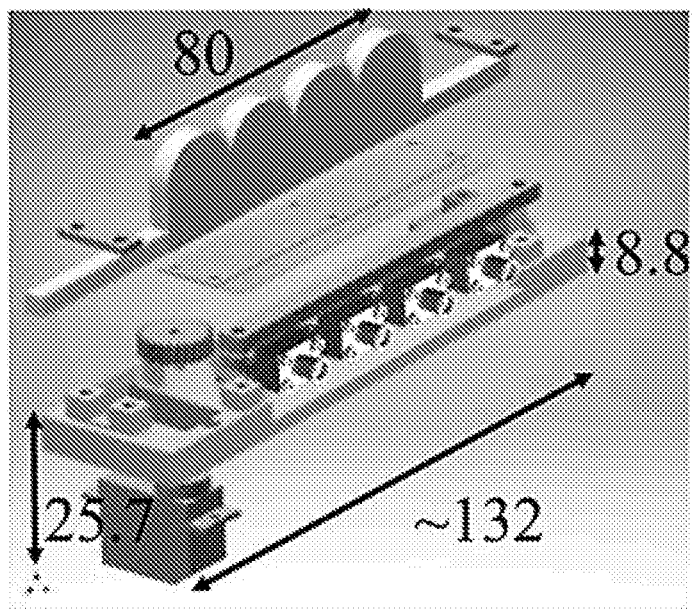
Figure 10B:
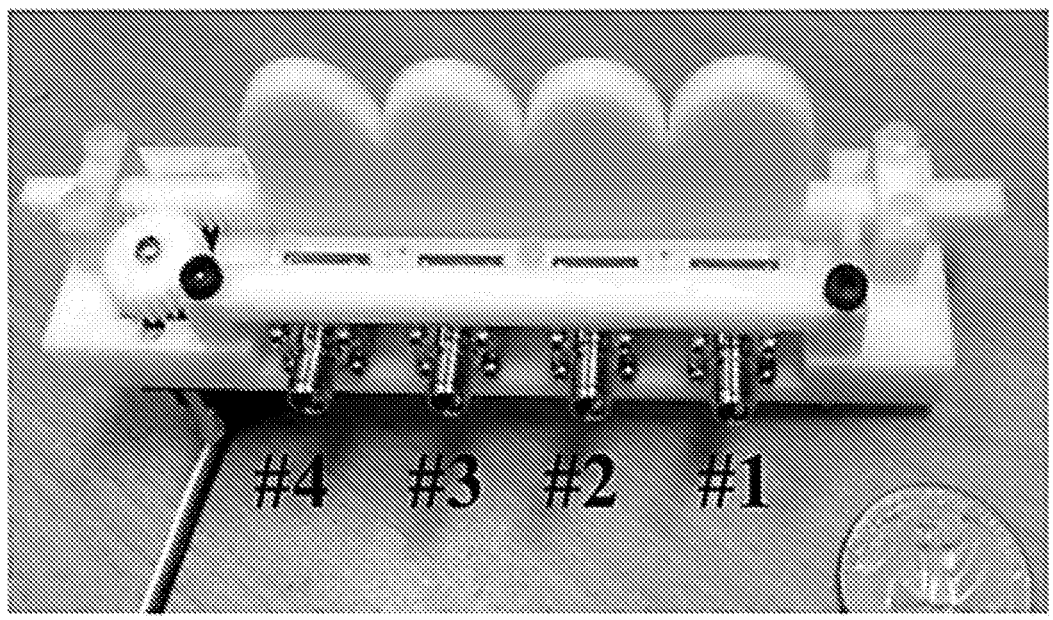

FIG. 10A is an image depicting the antenna assembly used for verification, and FIG. 10B is an image of the antenna prototype (without conductive walls). Mechanical movement is used to demonstrate the antenna performance without the SPST network implementation. A microservo motor with 3.2×1.2×2.9 cm3 volume, 9 g weight, and 1 W dc power consumption (<0.05 W in idle state) is interfaced with a microprocessor to control the movement accuracy. The feed antennas were realized with multilayered PCB fabrication and interfaced with 2.92 mm edge connectors. The lenses and the linear gear were fabricated as a single part by making use of an nScrypt 3Dn printer. The antenna prototype does not include the conductive walls for fabrication ease. The gear and the customized holder were also fabricated with the same 3-D printer. The motor and the parts were assembled together with plastic screws. The PS integration was emulated in software by multiplying and/or summing the measured individual lens patterns and using a 5-bit phase quantization. The total motion range required to steer the beam within the FoV is 16 mm (my=8 mm). This can be traversed in 100 ms based on the selected motor model and gear size. FIG. 9B depicts the antenna prototype.

The measured $|S_{11}|$ performance of the feed antennas is shown in FIG. 10C (measured reflection coefficients from the feed antennas). Specifically, the antennas are well matched with 8.5% $|S_{11}|$<10 dB bandwidth and exhibit slight center frequency shifts with respect to each other. These bandwidth and center frequency shifts are likely due to the small dimensional variations resulting from fabrication when etching the coupling apertures. On the other hand, the slight variations in substrate dimensions and their electrical properties (along with the coupling aperture variations) could have resulted in the difference between simulated and measured center frequency. Nevertheless, the antennas are still well matched at 38 GHz.

FIGS. 10D, 10E and 10F depict representative H-plane measured gain patterns at 38 GHz for different my positions of: my=0, my=4 mm, and my=8 mm, respectively. The maximum and minimum gains were 15.7 and 13.15 dBi for the 0° and 35° directions, respectively. Considering that edge connectors exhibit 0.5-0.7 dB insertion loss within 30-40 GHz band, the measured and simulated gain performances are in excellent agreement. From this agreement, it can be concluded that the radiation efficiency of the LAS antenna is almost identical to the simulated value of 71% (which includes the additional loss of the extended feedline for experimental purposes).

A mm-wave beam steering antenna based on the LASs has been introduced.

As compared to a traditional phased array, the LAS-based antenna offers a reduced hardware complexity by utilizing multiple-throw switch networks to significantly reduce the number of PSs. The lens diameter can potentially be selected small enough to achieve a low profile and reduce the number of Tx/Rx amplifier and switch networks. A 38 GHz antenna design comprising L=4 LASs was presented to demonstrate the concept. Each LAS utilizes the DSW-based hemi-cylindrical lens with five feed antennas. For rapid prototyping, mechanical movement over a single-feed antenna was utilized to emulate the presence of these five feed antennas. The prototype performed with 8.5% $|S_{11}|$<10 dB bandwidth, 15.7 dBi gain, 5.2° H-plane HPBW, and 75° beam steering range.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A lens antenna subarray (LAS), comprising:
a plurality of antenna elements configured to selectively receive a radio frequency (RF) transmission signal from RF processing circuitry, the RF transmission signal provided to a selected antenna of the plurality of antenna elements via a switching network, a common phase shifter, and an amplification and switch (A&S) stage; and
a lens extending across the plurality of antenna elements, the lens configured to steer a RF transmission generated by the selected antenna of the plurality of antenna elements in a defined direction, the selected antenna determined by the switching network.

2. The LAS of claim 1, wherein the RF processing circuitry comprises a RF chain that provides the RF transmission signal to the common phase shifter for transmission by the selected antenna.

3. The LAS of claim 1, wherein the plurality of antenna elements consists of M antenna elements and the switching network and the switching network comprises a single-pole M-throw (SP(M)T) switch configured to switch between the M antenna elements to direct the RF transmission signal to the selected antenna for transmission through the lens.

4. The LAS of claim 1, wherein the lens is a dielectric slab waveguide (DSW) lens.

* * * * *